(12) United States Patent
Owens

(10) Patent No.: US 7,690,540 B1
(45) Date of Patent: Apr. 6, 2010

(54) LIQUID ANIMAL SCENT DISPENSER

(76) Inventor: John J. Owens, 9147 E. Bakerville Rd., Mount Vernon, IL (US) 62864

( * ) Notice: Subject to any disclaimer, the term of this patent is extended or adjusted under 35 U.S.C. 154(b) by 588 days.

(21) Appl. No.: 11/372,977

(22) Filed: Mar. 10, 2006

Related U.S. Application Data

(60) Provisional application No. 60/659,910, filed on Mar. 10, 2005.

(51) Int. Cl.
*G05D 7/00* (2006.01)

(52) U.S. Cl. .............................. 222/642; 43/1; 222/175

(58) Field of Classification Search ............ 222/52–69, 222/333, 638–652, 175; 43/1; 261/26; 239/35, 239/36, 67–71, 653, 152–154; 4/228.1, 222
See application file for complete search history.

(56) References Cited

U.S. PATENT DOCUMENTS

| | | | |
|---|---|---|---|
| 3,856,209 A | 12/1974 | Hickson | 239/532 |
| 4,625,342 A * | 12/1986 | Gangnath et al. | 4/228.1 |
| 4,682,715 A | 7/1987 | Reeves | 222/175 |
| 4,867,076 A | 9/1989 | Marcone | 109/20 |
| 4,953,763 A * | 9/1990 | Kierum et al. | 222/644 |
| 4,967,935 A * | 11/1990 | Celest | 222/52 |
| 4,989,547 A | 2/1991 | Eaton | 119/51.11 |
| 5,148,949 A | 9/1992 | Luca | 222/175 |
| 5,299,376 A | 4/1994 | Roberts | 43/2 |
| 5,368,202 A | 11/1994 | Smrt | 222/174 |
| 5,461,814 A | 10/1995 | Reid et al. | 43/1 |
| 5,471,768 A | 12/1995 | Pryor | 36/3 R |
| 5,675,845 A * | 10/1997 | Martin et al. | 4/228.1 |
| 5,769,279 A | 6/1998 | Smrt | 222/174 |
| 5,823,390 A * | 10/1998 | Muderlak et al. | 222/38 |
| 5,901,490 A | 5/1999 | Lush | 43/1 |
| 5,906,298 A | 5/1999 | Ward | 222/175 |
| 5,908,140 A * | 6/1999 | Muderlak et al. | 222/1 |
| 5,924,221 A | 7/1999 | Schuver et al. | 36/136 |
| 5,971,208 A | 10/1999 | Kennedy | 222/54 |
| 5,987,800 A | 11/1999 | Regan | 43/1 |
| 6,038,804 A | 3/2000 | Cuerrier | 43/1 |
| 6,209,252 B1 | 4/2001 | McGough | 43/1 |
| 6,267,297 B1 * | 7/2001 | Contadini et al. | 239/1 |
| 6,398,126 B1 | 6/2002 | Pitchford | 239/36 |
| 6,431,400 B1 * | 8/2002 | O'Maley et al. | 222/41 |
| 6,550,689 B1 | 4/2003 | Hoyes et al. | 239/1 |
| 6,592,104 B2 * | 7/2003 | Cox | 261/26 |
| 6,655,604 B2 | 12/2003 | Tuttobene, Jr. | 239/6 |
| 6,752,069 B1 * | 6/2004 | Burke et al. | 99/280 |
| 7,086,567 B1 * | 8/2006 | Ciavarella et al. | 222/95 |
| 7,108,199 B1 * | 9/2006 | Brown | 239/70 |
| 2005/0133543 A1* | 6/2005 | Clifford et al. | 222/420 |
| 2007/0102456 A1* | 5/2007 | Tsay | 222/321.8 |

* cited by examiner

*Primary Examiner*—Kevin P Shaver
*Assistant Examiner*—Robert K Nichols, II
(74) *Attorney, Agent, or Firm*—Grace J. Fishel

(57) ABSTRACT

A liquid scent dispenser for spraying droplets of liquid scent under control of a controller. In a manual mode, the controller is programmed to dispense droplets at intervals on signal of a tilt switch such that the times of spraying can be keyed to a hunter's walking rate. In an automatic mode, the controller is programmed to dispense droplets at preset intervals. LEDs are provided on the dispenser to indicate the mode in which the controller is programmed.

9 Claims, 5 Drawing Sheets

LIQUID ANIMAL SCENT DISPENSER

This application claims priority from provisional application Ser. No. 60/659,910, filed Mar. 10, 2005, for Dual Control Scent Applicator.

BACKGROUND OF THE INVENTION

1. Field of the Invention

The present invention relates to a liquid animal scent dispenser that can be carried on a user's person and is programmed to have a manual and automatic mode for spraying droplets of the liquid scent on the ground to conceal the user's scent trail and to attract animals towards him.

2. Brief Description of the Prior Art

Game animals such as deer and the like are known to be attracted during mating season by certain scents classified as pheromones. In the case of a doe, the pheromone is contained in her urine which is sprinkled on the ground as a means of notifying a buck of her availability. Chemists and others have developed both artificial and natural scents which substantially duplicate the smell of doe-in-estrus urine. Such liquid scents are offered in small quantities and at high cost.

In general game animals are sensitive to the odor of humans. Accordingly, hunters need to disguise their scent trail. In hunting deer, doe urine can be used for that purpose. A properly applied trail of doe urine, in addition to masking the hunter's scent, may also attract a buck towards the hunter who lies in wait.

One of the most common dispensers for liquid scent is a drag rag. For covering a trail with a drag rag, a hunter applies liquid scent to an absorbent pad which is then dragged behind him as he walks. By applying the scent in this manner, the scent rubs off on the trail and is applied in a manner simulating the natural method of scent presentation by a doe but as the rag is dragged, the scent is diluted. This results in a strong scent at the beginning and a weak scent trailing off at the end. If a buck crosses the hunter's trail, he is just as likely or more likely to head away from the hunter than towards him as the trail tapers stronger towards where the hunter began.

There are dispensers that hook to the branch of a tree for dripping liquid scent on the ground and there are dispensers that spray the liquid scent into the air where it dissipates quickly. Most such dispensers are designed for use after the hunter reaches his hunting site as opposed to covering his trail.

Some are activated with timers having a single mode of operation such that the liquid scent is distributed at preset intervals.

What is needed is a sophisticated liquid scent dispenser that can be carried on the person of a hunter, that is programmed to spray droplets of liquid scent on the hunter's trail and that can be used in a fixed location after he arrives at his hunting site. For the purpose of conserving the expensive liquid scent, the dispenser should be programmed in several modes, one of which is a manual mode that times the spraying to the hunter's walking rate in addition to an automatic mode which sprays the liquid scent at preset intervals. In the manual mode, if the hunter stops to rest, the dispenser should stop spraying, and if he changes his rate of walking, the dispenser should adjust the intervals between spraying to his walking rate. Insofar as known, no liquid scent dispenser has recognized the need and benefit of such a combination of features.

BRIEF SUMMARY OF THE INVENTION

In view of the above, it is an object of the present invention to provide a liquid scent dispenser that is programmed in one mode to time the intervals between sprays of liquid scent on the ground to a user's walking rate. It is another object to provide a scent dispenser that is programmed in another mode to spray droplets of liquid scent at preset intervals. It is also an object to provide a liquid scent dispenser that can be carried on a user's person for use in concealing his scent trail and can be used in a fixed location to attract animals towards him when he lies in wait. Other objects and features of the invention will be in part apparent and in part pointed out hereinafter.

In accordance with the invention, a liquid scent dispenser in broadest context includes a reservoir for liquid scent, a spray nozzle and an electric pump for pumping the liquid scent from the reservoir through the spray nozzle under operational choices managed by a controller in response to signals received from a switch. The controller is connected to a source of electric power and programmed to activate the electric pump in a manual mode upon receipt of a first signal from the switch and to activate the electric pump into an automatic mode upon receipt of a second signal from the switch.

In the manual mode the liquid scent dispenser may spray droplets of scent timed to a user's walking rate and in the automatic mode the liquid scent dispenser may spray droplets of scent at preset intervals. The controller may also be programmed to place the liquid scent dispenser in a prime mode and to indicate a low battery condition.

The invention summarized above comprises the constructions hereinafter described, the scope of the invention being indicated by the subjoined claims.

BRIEF DESCRIPTION OF THE SEVERAL VIEWS OF THE DRAWING

In the accompanying drawings, in which one of various possible embodiments of the invention is illustrated, corresponding reference characters refer to corresponding parts throughout the several views of the drawings in which.

DETAILED DESCRIPTION OF THE INVENTION

Figure 1:
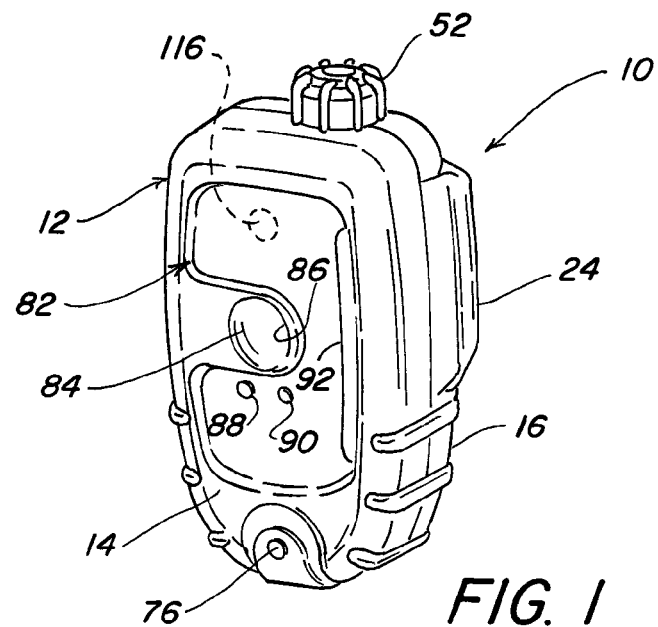
FIG. 1 is a perspective view of a liquid scent dispenser in accordance with the present invention.
Figure 2:
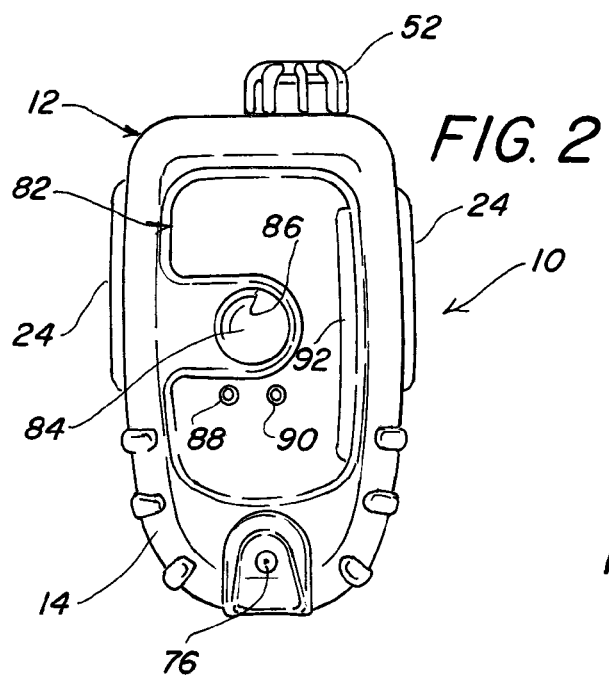
FIG. 2 is a front elevation of the liquid scent dispenser.
Figure 3:
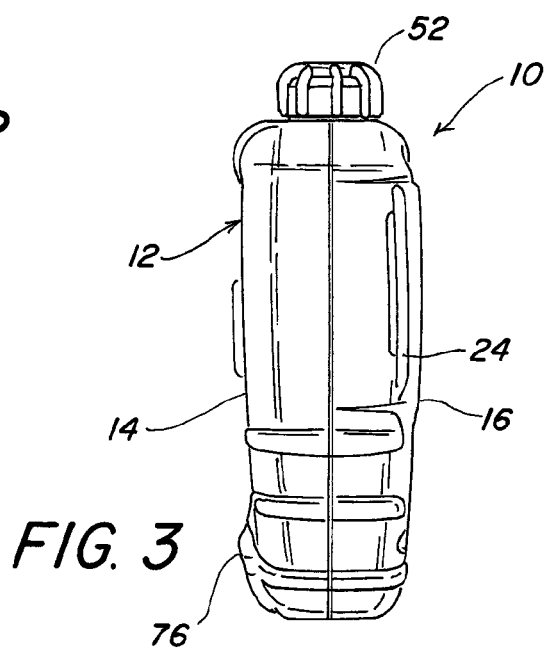
FIG. 3 is a side elevation of the liquid scent dispenser.

Referring to the drawings more particularly by reference character, reference numeral 10 refers to a liquid scent dispenser in accordance with the present invention. Liquid scent dispenser 10 is designed to spray droplets of doe-in-estrus urine or the like onto the ground in a manner simulating the natural method of scent presentation used by a deer. It is also designed to dispense the droplets in a continuous intermittent line for concealing a hunter's scent trail and for attracting animals towards him.

While the following discussion is focused on deer, it will be apparent that the use of liquid scent dispenser 10 is not limited to doe-in-estrus urine. Pheromones may be preferred as they mask human odors and may also act to lure the animals towards the hunter but other scents common to the environment of the game animal may be used. Such scents include musk of the hunted animal, urine from the same or other co-inhabitant animals, pine, cedar, oak and so forth.

Liquid scent dispenser 10 is housed in an enclosure 12 having a front section 14 and a rear section 16 and can be made of plastic, metal or any other suitable material. As illustrated in the drawings, enclosure 10 is formed from a suitable, durable, rigid polymeric material preferably by conventional molding or extruding. Enclosure 10 may be treated with a camouflage coating. Front and rear sections 14, 16 may be formed as generally open-topped boxes with a rim 18 of front section 14 slip fitted over a rim 20 of rear section 16. Front and rear sections 14, 16 may be secured together by a suitable means, e.g., screws 22.

Figure 6:
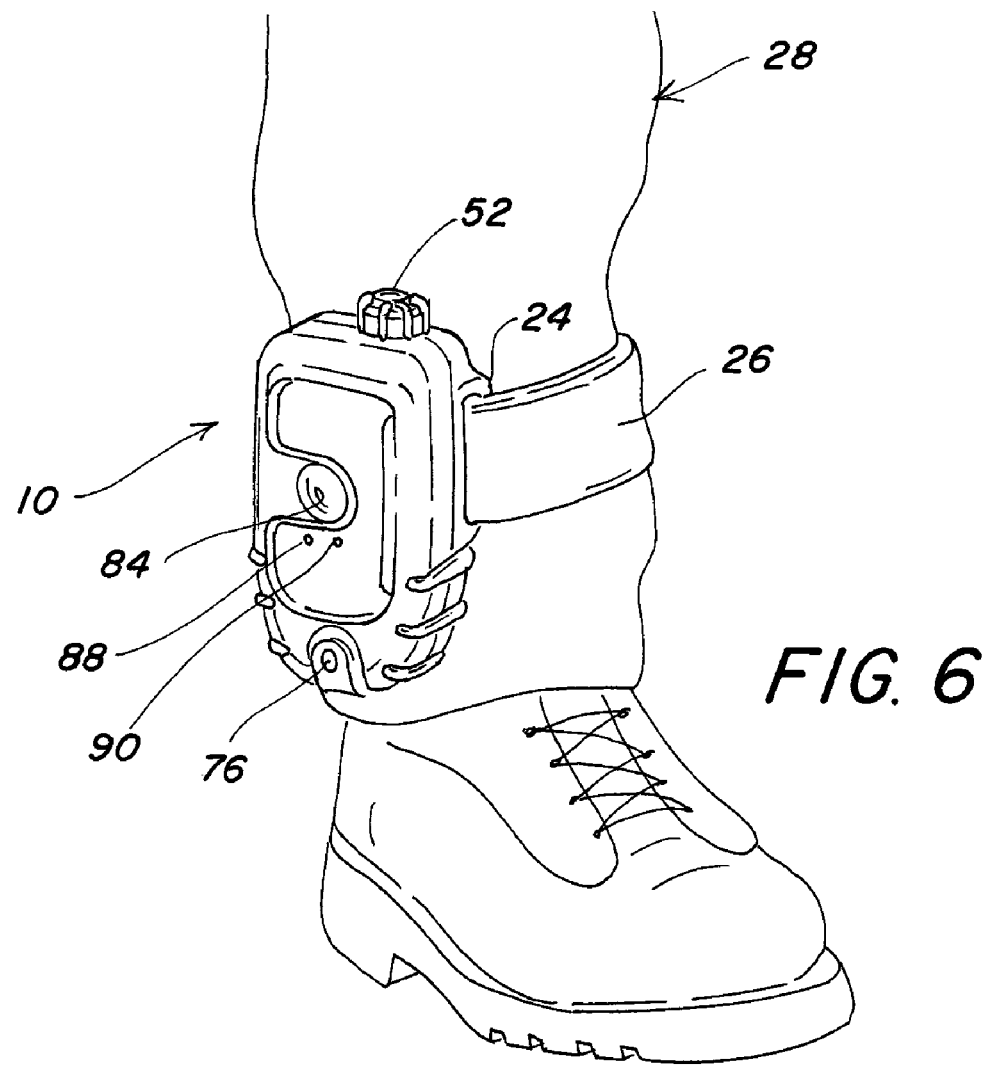
FIG. 6 is perspective view of the liquid scent dispenser strapped to a leg of user.

Enclosure 12 is provided with lugs 24 on opposite sides of rear section 16 for attachment to a strap 26 which may be used to attach liquid scent dispenser 10 to a leg 28 of a user as shown in FIG. 6. Strap 26 may elasticized or include a buckle, mating male and female members such as VELCRO or other such conventional closure means for cinching strap 26 to leg 28 at about ankle height. Strap 26 may also be used to hang liquid scent dispenser 10 from a tree branch as more particularly described below.

Figure 4:
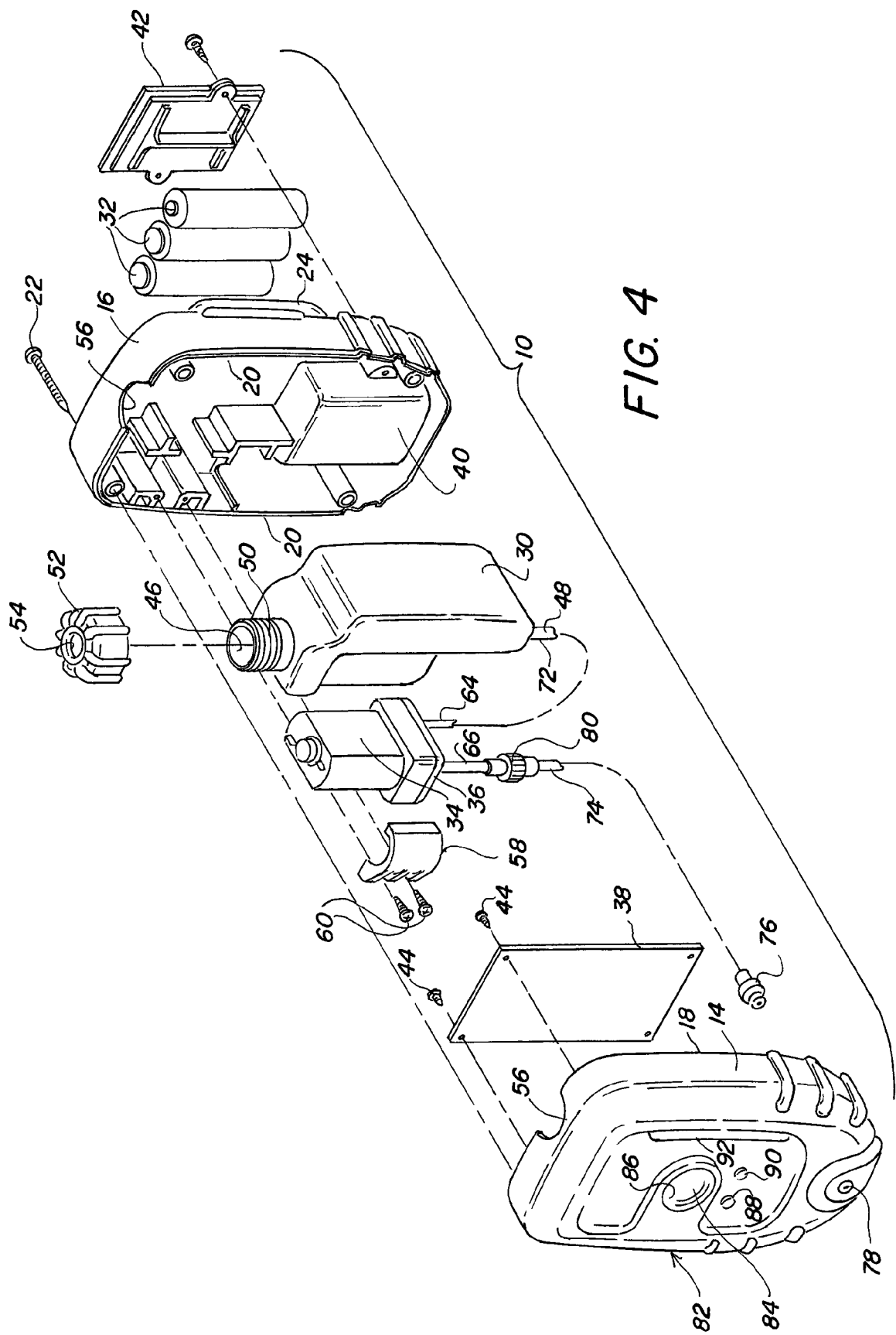
FIG. 4 is an exploded perspective view of the liquid scent dispenser.

A liquid reservoir 30, electrical power source 32, a motor 34 for operating a pump 36 and a circuit board 38 are all contained within enclosure 12. Electric power source 32 may be batteries or any other power source known in the art, such as solar power for instance. As shown in FIG. 4, batteries 32, illustrated as three AAA batteries, may be disposed within a battery storage compartment 40 provided in rear section 16 of enclosure 12. Batteries 32 are accessible through a battery storage compartment door 42 and are electrically connected to circuit board 38. Circuit board 38 is attached to front section 14 by a suitable means, e.g., screws 44.

Liquid reservoir 30 can be made of plastic, metal or any other suitable material. As illustrated in the drawings, liquid reservoir 30 is formed from a suitable, durable, rigid polymeric material preferably by conventional molding or extruding and is somewhat translucent such that the liquid level in reservoir 30 can be seen through the sidewalls thereof. Liquid reservoir 30 is configured such that it can be seated in rear section 16 of enclosure 12 about battery storage compartment 40. Liquid reservoir 30 has an opening 46 in the top and a nippled outlet 48 in the bottom. A neck 50 of opening 46 is threaded male to receive a removable cap 52 which is threaded female for this union. Cap 52 includes a small vent hole 54 to relieve the vacuum as liquid scent is drained through outlet 48. Front and rear sections 14, 16 of enclosure 12 are relieved to form a collar 56 for passage of neck 50 through enclosure 12 such that opening 46 may be accessed from the outside by removal of cap 52. Removable cap 52 permits reservoir 30 to be filled with liquid scent from the outside and to be drained of liquid scent if the user decides to clean the dispenser or use another scent.

Figure 5:
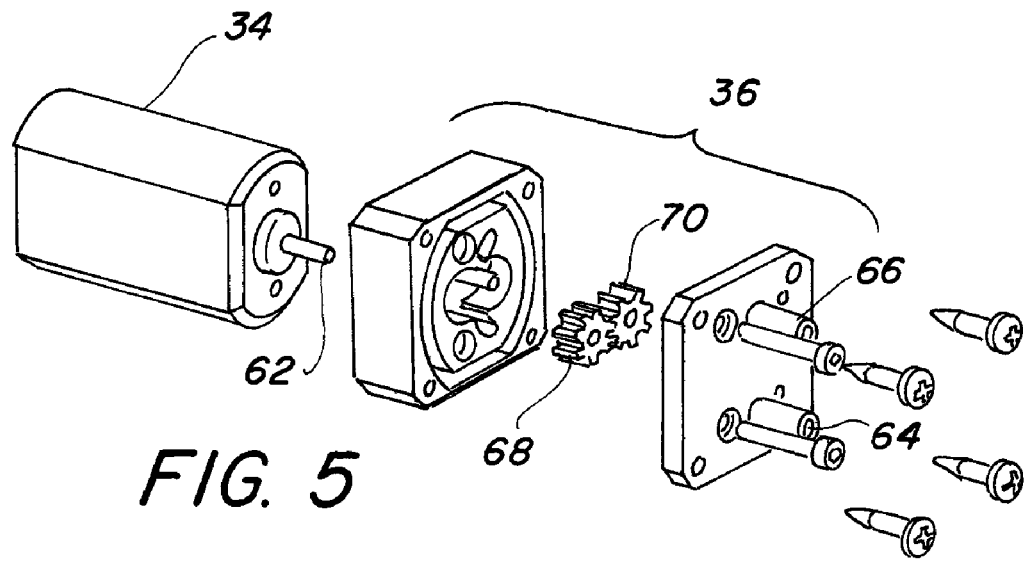
FIG. 5 is an exploded perspective view of a gear pump for attachment to a motor.

Electric motor 34 is attached to rear section 16 with a clamp 58 by a suitable means, e.g., screws 60. An output shaft 62 of motor 34 drives pump 36 which, as shown in FIG. 5, may be a gear pump with a nippled inlet 64 and a nippled outlet 66. Gear pump 36 includes a drive gear 68 connected to output shaft 62 of motor 34 and a driven gear 70 in mesh with drive gear 68. A first length of tubing 72 connects nippled outlet 48 in reservoir 30 with nippled inlet 64 in pump 36. A second length of tubing 74 connects nippled outlet 66 in pump 36 with a spray nozzle 76 which protrudes through a hole 78 in front section 14. As motor 34 turns gears 68, 70, liquid scent is drawn from liquid reservoir 30 and sprayed out nozzle 78. Nozzle 78 may be directed outwardly and downwardly such that droplets of the liquid scent are directed towards the ground and away from a hunter carrying liquid scent dispenser 10 on his leg 28. An anti-drip check valve 80 may be provided in second length of tubing 74 between outlet 66 of pump 36 and spray nozzle 76.

A control panel 82 may be molded on the outside of front section 14. A switch 84 for mode selection such as a pressure sensitive touch switch may be seated in a recess 86 provided in control panel 82. A pair of windows 88, 90 may be provided in control panel 82 through which LEDs may be viewed for indicating the mode in which liquid scent dispenser 10 has been placed. A liquid fill window 92 may also be provided in control panel 82 through which the liquid level in reservoir 30 may be viewed. Optionally, liquid fill window 92 may be located in the seam between front and rear sections 14, 16 or otherwise.

Figure 7:
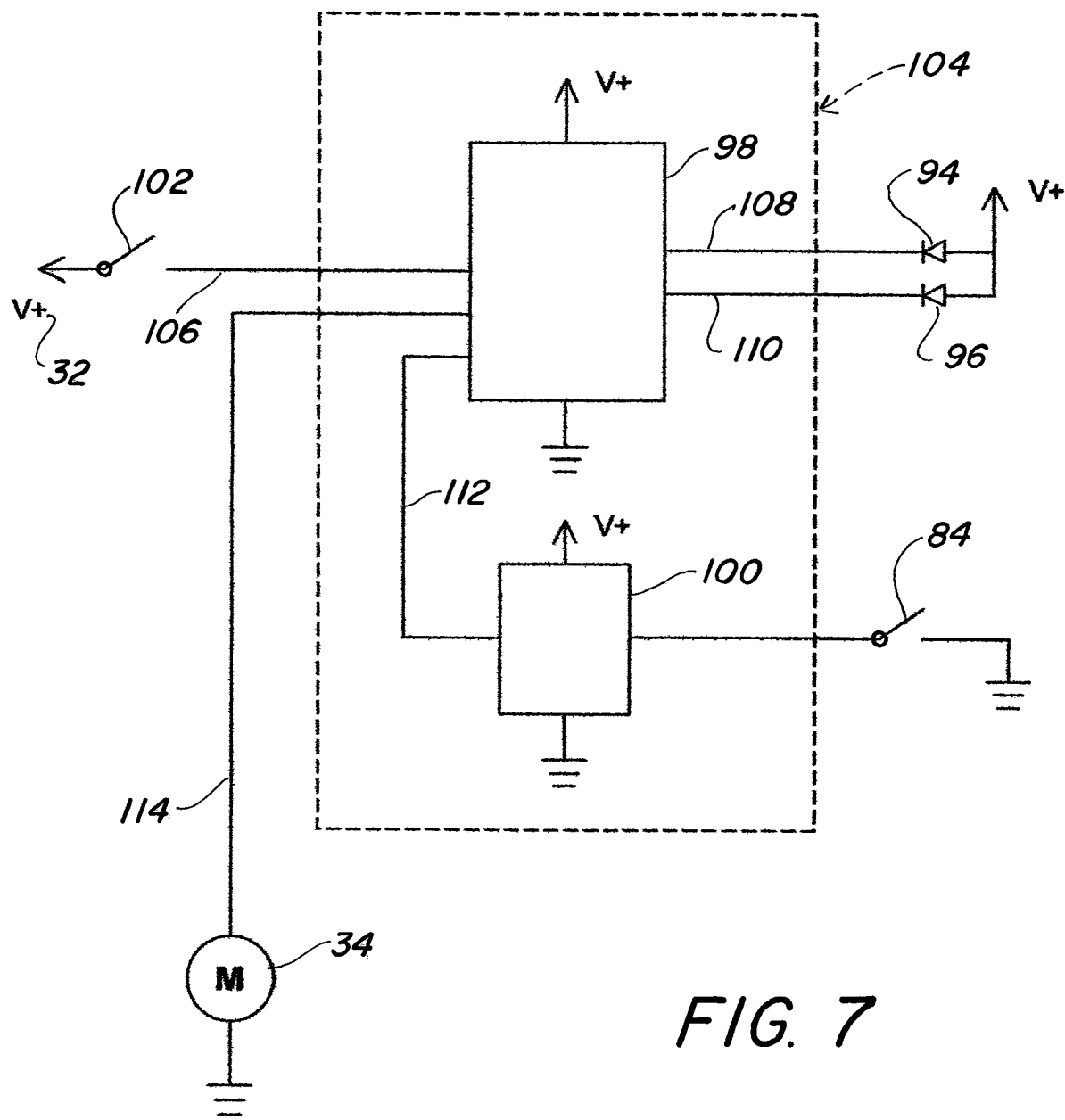
FIG. 7 is a simplified electric circuit for programming the operation of the motor in operational choices managed by a processor in response to signals received from a touch switch and a tilt switch; and, FIG. 8 is a schematic block diagram of the electrical circuitry.
Figure 8:
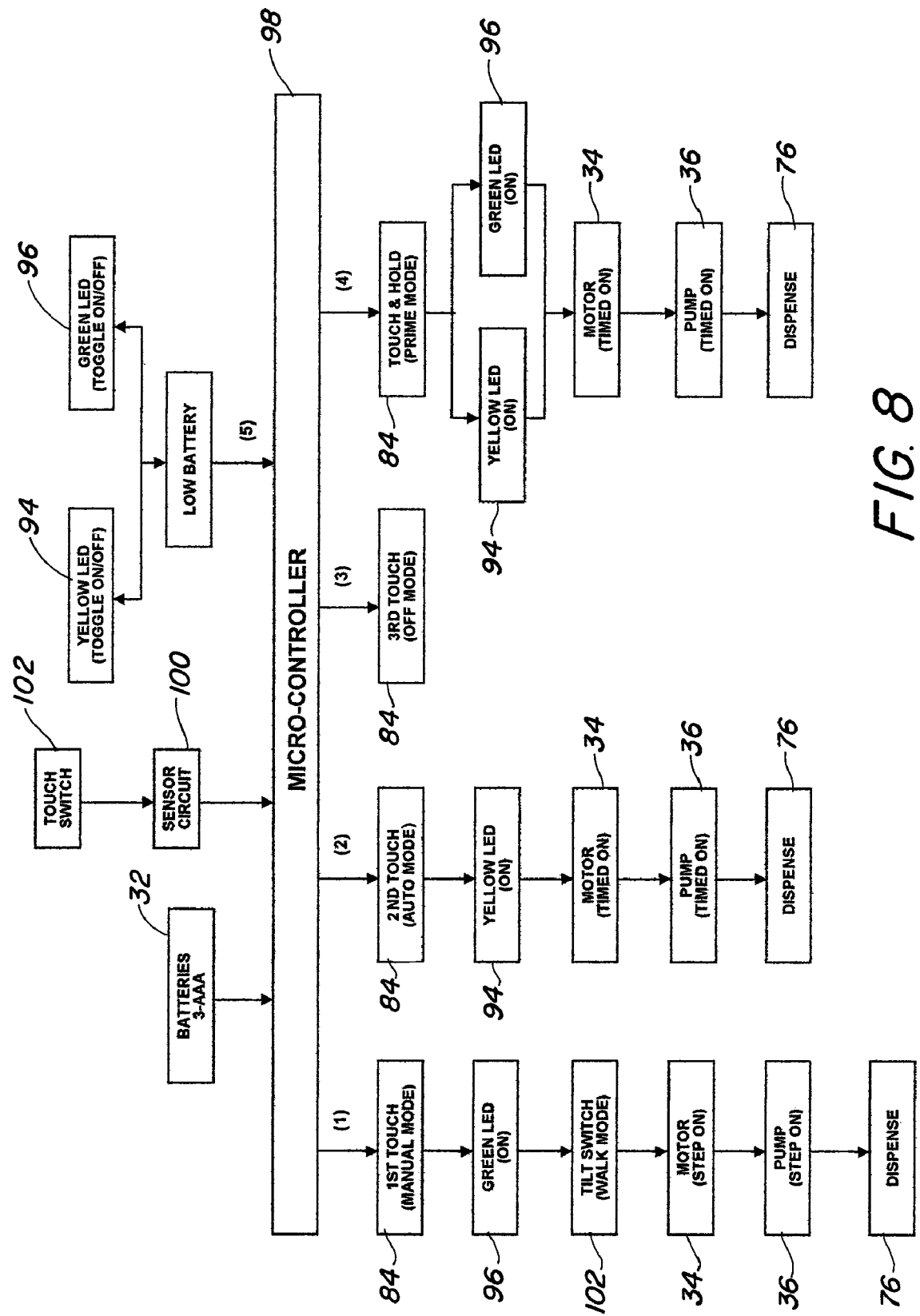

One or more LEDs, illustrated as a yellow LED 94 and a green LED 96 and motor 34 are connected to batteries 32 through circuit board 38. Motor 34 and LEDs 94, 96 are managed by an electrical circuit including a controller 98 and a touch sensor circuit 100 in response to signals received from touch switch 84 and from a tilt switch 102. A simplified electrical circuit 104 is shown in FIG. 7 and a schematic block diagram of the electrical circuitry is shown in FIG. 8. LEDs 94, 96 and tilt switch 102 may be mounted on circuit board 38 with the LEDs aligned with windows 94, 96 in control panel 82.

Referring first to FIG. 7, controller 98 is connected by a line 106 to tilt switch 102, a line 108 to yellow LED 94, a line 110 to green LED 96, a line 112 to touch sensor circuit 100 and a line 114 to motor 34. Tilt switch 102 opens and closes in response to movement of liquid scent dispenser 10 as for example when the user walks. Touch sensor circuit 100 is designed such that it is capable of sending different signals though line 112 to controller 98 in response to touch switch 84.

Turning now to FIG. 8, touch sensor circuit 100 may be designed and controller 98 may be programmed, for example, as follows:

(1) Starting with liquid scent dispenser 10 in "off" condition, when a user momentarily presses touch switch 84, a signal is sent by touch sensor circuit 100 through line 112 to controller 98. In response, controller 98 is programmed to activate green LED 96 through line 110 indicating that liquid scent dispenser 10 is in the manual mode. Controller 98 is further programmed to activate motor 34 for a predetermined time through line 114 upon receiving a signal from tilt switch 102. Controller 98 may include a counter that activates motor 34 ever other closure of tilt switch 102 correlated with every other footstep of the user. It will be understood, however, that controller 98 may be programmed such that motor 34 is activated on each step, every third step, etc. within circuit capabilities of electrical circuit 104. It will also be apparent that the duration of time that motor 34 is activated may also be adjusted within circuit capabilities of electrical circuit 104.

(2) If touch switch 84 is pressed a second time momentarily, a signal is sent by touch sensor circuit 100 through line 112 to controller 98 placing liquid scent dispenser 10 in automatic mode. In this mode, controller 98 is programmed to activate yellow LED 94 through line 108 and motor 34 through line 114. Controller 98 is programmed such that motor 34 is activated at preset intervals for preset durations.

(3) If touch switch 84 is momentarily pressed a third time, a signal is sent by touch sensor circuit 100 through line 112 to controller 98 placing liquid scent dispenser 10 in "off" condition.

(4) If touch switch 84 is pressed for an extended time of predetermined length, a signal is sent by touch sensor circuit 100 through line 112 to controller 98 placing liquid scent dispenser in a prime mode. Controller 98 is programmed to activate both yellow LED 94 and green LED 96 and motor 34. Motor 34 is operated for a predetermine time to fill first and second lengths of tubing 72, 74, respectively, with liquid scent from reservoir 30 and then return to the previous mode prior to entering this mode. Hold time and dispensing time in the prime mode are adjustable within the circuit capabilities of electric circuit 104.

(5) Controller 98 may be programmed to monitor the voltage output of batteries 32. When the voltage reaches an unsafe level for electrical circuit 104, controller 98 may be programmed to ignore all commands from touch switch 86 and tilt switch 102. Yellow LED 94 and green LED 96 flash in toggle effect until batteries 32 are replaced or liquid scent dispenser 10 totally drains all voltage.

A commercially available controller 98 is available from Microchip as part No. PIC16F88 and a commercially available touch sensor circuit 100 is available from Quantum Research Group as part No. QT118H. It will apparent that other components having similar functionality may be used and that the functional portions may be combined into a single circuit or divided into separate circuits depending on price and availability of the components and the builder's preferences. For example, the counter used with tilt switch 102 and the clocking functions in controller 98 may be in separate circuits, etc. Other colors for LEDs 94, 96 may be used and the significance of the colors as to the mode indicated is arbitrary. It will also be apparent that other components such as a DC to DC converter may be needed to complete the electrical circuit 104, for example to match the voltage output of batteries 32 to the requirements of motor 34, and so forth. Controller 98 may also be programmable by a user or preprogrammed.

In use, a user may fill reservoir 30 with a liquid scent and press and hold touch switch 84 to place liquid scent dispenser in a prime mode so that first and second lengths of tubing 72, 74 are filled with scent. He may then attach dispenser 10 to his leg 28 with strap 26 in manner such that nozzle 76 is directed outwardly to the side or to the back.

If the user desires for liquid scent dispenser 10 to be in manual mode, he may press touch switch 84 once. Depending on how controller 98 is programmed, liquid scent will be sprayed from nozzle 76 for the predetermined duration every other step or the like. If the user prefers for liquid scent dispenser 10 to be in automatic mode, he may press touch switch 84 twice. Depending on how controller 98 is programmed, liquid scent will then be sprayed from nozzle 76 for a predetermined duration at predetermined intervals.

As the user walks, droplets of liquid scent are sprayed on the ground covering the hunter's scent and perhaps attracting the hunted game animal towards him. Since liquid scent dispenser 10 does not drag on the ground, unlike drag rag devices, there are no problems with entanglement and noise generation. Upon arriving at his destination, the user may press touch switch 84 again placing liquid scent dispenser 10 in "off" condition, assuming that it was previously in automatic mode, unstrap liquid scent dispenser 10 and place the dispenser in a fixed location for example by using strap 26 to attach it to a tree limb. Liquid scent dispenser 10 may then be placed in automatic mode by pressing touch switch 84 twice such that it periodically dispenses droplets of liquid scent. A motion detector 116 (FIG. 1) may be provided on liquid scent dispenser 10 for detecting game. Motion detector 116 may be connected to electrical circuit 104 and controller 98 may be programmed to place liquid scent dispenser in "off" mode when an animal approaches.

When the user is done with liquid scent dispenser 10, he may unscrew cap 52 and drain the liquid scent from reservoir 30 back into the bottle in which it was purchased. Liquid scent dispenser 10 can be rinsed by filling reservoir 30 with water and operating pump 36 in prime mode to flush the system with water. Reservoir 30 can then be filled with another scent if desired or liquid scent dispenser 10 stored for future use.

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed:

1. A liquid scent dispenser comprising:
    a reservoir for liquid scent;
    a spray nozzle;
    a gear pump with a pair of gears for pumping the liquid scent through the tubing from the reservoir through the spray nozzle;
    a circuit board including an electric circuit with a controller and a touch sensor circuit;
    said controller connected to a source of electric power and programmed to activate the gear pump in a manual mode under control of a tilt switch upon receipt of a first signal from a switch and to activate the gear pump into an automatic mode upon receipt of a second signal from the switch;
    said reservoir, gear pump, circuit board and source of electric power contained within an enclosure having means for attachment to a leg of a user, said spray nozzle spraying droplets of liquid scent from the enclosure.

2. The liquid scent dispenser of claim 1 wherein the switch is a touch switch on an outside of the enclosure that when momentarily touched a first time places the controller in the manual mode and when touched a second time places the controller in the automatic mode.

3. The liquid scent dispenser of claim 2 further comprising at least two light emitting diodes (LEDs) connected to the circuit board, said controller programmed to selectively activate a first of the LEDs when the liquid scent dispenser is in manual mode and programmed to selectively activate a second of the LEDs when the liquid scent dispenser is in the automatic mode, each of said LEDs when activated visible through a window provided in the enclosure.

4. The liquid scent dispenser of claim 3 wherein in the second mode, the controller is programmed to activate the gear pump at preset intervals.

5. A liquid scent dispenser comprising:
    a reservoir for liquid scent;
    a spray nozzle;
    a gear pump with a pair of gears for pumping the liquid scent through the tubing from the reservoir through the spray nozzle;
    a circuit board including two light emitting diodes (LEDs), a tilt switch and an electric circuit with a controller and a touch sensor circuit;
    said controller connected to a source of electric power and programmed to activate the gear pump in a manual mode under control of a tilt switch upon receipt of a first signal from the touch sensor circuit and to activate the gear pump into an automatic mode upon receipt of a second signal from the touch sensor circuit, said signals from the touch sensor circuit initiated by a touch switch, said controller activating a first of the LEDs in the manual mode and a second of the LEDs in the automatic mode;

said reservoir, gear pump, circuit board and source of electric power contained within an enclosure having means for attachment to a leg of a user with a strap, said touch switch located on the outside of the enclosure, said spray nozzle spraying droplets of liquid scent from the enclosure when the gear pump is activated, each of said LEDs visible when activated through a window in the enclosure.

6. The liquid scent dispenser of claim 5 wherein in the second mode, the controller is programmed to activate the gear pump at preset intervals.

7. The liquid scent dispenser of claim 5 wherein the reservoir is translucent so that the liquid level can be viewed through a liquid level window in the enclosure.

8. The liquid scent dispenser of claim 5 wherein a first length of tubing connects the reservoir with an inlet of the gear pump and a second length of tubing connects an outlet of the gear pump with the nozzle and wherein the controller is programmed in a prime mode to activate the gear pump for a predetermined time to fill first and second lengths of tubing with liquid scent from the reservoir.

9. The liquid scent dispenser of claim 8 wherein the controller is programmed to activate both of the LEDs in the prime mode while the gear pump is activated.

* * * * *